US009383433B2

(12) United States Patent
Doyle (10) Patent No.: US 9,383,433 B2
(45) Date of Patent: Jul. 5, 2016

(54) SYSTEM AND METHOD FOR CALIBRATION AND BUILT-IN SELF TEST OF AUTOMOBILE RADAR SYSTEM (71) Applicant: Autoliv ASP Inc., Ogden, UT (US)

(72) Inventor: Scott B. Doyle, Sudbury, MA (US)

(73) Assignee: Autoliv ASP, Inc., Ogden, UT (US)

( * ) Notice: Subject to any disclaimer, the term of this patent is extended or adjusted under 35 U.S.C. 154(b) by 476 days.

(21) Appl. No.: 13/834,647

(22) Filed: Mar. 15, 2013

(65) Prior Publication Data
US 2014/0266865 A1    Sep. 18, 2014

(51) Int. Cl.
*G01S 7/40* (2006.01)
*G01S 7/35* (2006.01)
*G01S 7/288* (2006.01)

(52) U.S. Cl.
CPC ............. *G01S 7/4004* (2013.01); *G01S 7/354* (2013.01); *G01S 2007/2886* (2013.01); *G01S 2007/358* (2013.01)

(58) Field of Classification Search
CPC .. H04B 1/30; H03B 27/00; G01S 2007/2886; G01S 7/354; G01S 7/4004
USPC ............................................ 342/70, 174, 194
See application file for complete search history.

(56) References Cited

U.S. PATENT DOCUMENTS

| | | | | |
|---|---|---|---|---|
| 4,254,482 A * | 3/1981 | Newman | ................. | G01F 1/002 342/124 |
| 4,320,531 A * | 3/1982 | Dimon | ..................... | H03D 1/00 327/113 |
| 5,223,843 A * | 6/1993 | Hutchinson | ............. | G01S 19/29 342/352 |
| 5,678,222 A * | 10/1997 | Hornak | .................... | H03D 7/00 327/113 |
| 5,969,667 A * | 10/1999 | Farmer | .................... | G01S 7/038 342/165 |
| 6,469,661 B1 * | 10/2002 | Doerry | .................... | G01S 7/288 342/194 |
| 6,836,240 B1 | 12/2004 | Dubbert et al. | | |
| 7,190,939 B2 * | 3/2007 | Son | .......................... | H04B 1/30 375/322 |
| 2004/0259519 A1 * | 12/2004 | Su | .......................... | H03D 7/165 455/326 |
| 2006/0160518 A1 * | 7/2006 | Seendripu | .............. | H03D 3/007 455/323 |
| 2007/0259642 A1 * | 11/2007 | Pullela | ................... | H03B 19/00 455/260 |
| 2010/0203860 A1 * | 8/2010 | Tillman | ................... | H03D 7/18 455/325 |
| 2013/0234879 A1 * | 9/2013 | Wilson-Langman | ... | G01S 7/352 342/21 |

FOREIGN PATENT DOCUMENTS

WO    9638924 A1    12/1996
WO    0227952 A1    4/2002

* cited by examiner

Primary Examiner — John B Sotomayor
Assistant Examiner — Marcus Windrich
(74) Attorney, Agent, or Firm — Burns & Levinson, LLP; Steven M. Mills (57) ABSTRACT

An I/Q mixer and processing method for a radar system include an RF input and an LO input. Phase shifters apply a selectable phase shift to the LO signal to produce a first phase-shifted version of the LO signal and a second phase-shifted version of the LO signal, the first and second phase-shifted versions of the LO signal being in quadrature. A first set of switches is controllable to selectively apply the selectable phase shift to the LO signal. A first mixer unit receives the RF signal at a first input of the first mixer unit, and a second mixer unit receives the RF signal at a first input of the second mixer unit. A second set of switches is controllable to apply one of the first and second phase-shifted versions of the LO signal to one of a second input of the first mixer unit and a second input of the second mixer unit and to apply the other of the first and second phase-shifted versions of the LO signal to the other of the second input of the first mixer unit and the second input of the second mixer unit. A counter generates a count for sequencing through states of the first and second sets of switches.

23 Claims, 6 Drawing Sheets

SYSTEM AND METHOD FOR CALIBRATION AND BUILT-IN SELF TEST OF AUTOMOBILE RADAR SYSTEM

BACKGROUND

1. Technical Field

This patent application is directed to automobile radar systems and, more particularly, to a system and method for providing error detection, calibration and built-in self-test (BIST) for an automobile radar system.

2. Discussion of the Related Art

Conventional automobile radar systems typically include an array of antenna elements, each connected to radar signal generation (transmission) and/or reception circuitry. Each transmission antenna element radiates when supplied with radar frequency (RF) power, and each receive antenna element responds to incident radiation of appropriate frequency by producing a received signal. In conventional homodyne radar systems, received signals are down-converted to a baseband signal by mixing with a local oscillator (LO) signal that is the same as the transmitted signal.

Radar systems can be subject to errors, which can result in errant detection and/or identification of targets in the surroundings of the host automobile. To improve the performance of automobile radar systems and, therefore, provide enhanced safety to the operator and passengers of the automobile, it is desirable to be able to test the radar system to identify possible sources of error. It is also desirable to implement appropriate corrective action based on detected errors. The corrective action can include calibrating the radar system to compensate for the errors.

SUMMARY

According to one aspect, an inphase/quadrature (I/Q) mixer for a radar system is provided. The I/Q mixer includes a radio frequency (RF) input for receiving an RF signal and a local oscillator (LO) input for receiving a LO signal. A plurality of phase shifters apply a selectable phase shift to the LO signal to produce a first phase-shifted version of the LO signal and a second phase-shifted version of the LO signal, the first and second phase-shifted versions of the LO signal being in quadrature. A first set of switches is controllable to selectively apply the selectable phase shift to the LO signal. A first mixer unit receives the RF signal at a first input of the first mixer unit, and a second mixer unit receives the RF signal at a first input of the second mixer unit. A second set of switches is controllable to apply one of the first and second phase-shifted versions of the LO signal to one of a second input of the first mixer unit and a second input of the second mixer unit and to apply the other of the first and second phase-shifted versions of the LO signal to the other of the second input of the first mixer unit and the second input of the second mixer unit. A counter generates a count, the count sequencing through states of the first and second sets of switches.

In some exemplary embodiments, the I/Q mixer is part of a homodyne radar system.

In some exemplary embodiments, the plurality of phase shifters comprise two fixed phase shifters, one of which provides 0 degrees of phase shift and another of which provides 180 degrees of phase shift. In some exemplary embodiments, the first set of switches is controllable to selectively apply phase shift of one of the two fixed phase shifters to the LO signal.

In some exemplary embodiments, the plurality of phase shifters comprise an I/Q phase shifter which provides 45 degrees of lead phase shift and 45 degrees of lag phase shift to generate the first and second phase-shifted versions of the LO signal in quadrature.

In some exemplary embodiments, the counter is a two-bit binary up/down counter.

In some exemplary embodiments, the phase shifters, switches and counter are built-in self-test (BIST) elements of the radar system.

In some exemplary embodiments, sequencing through the states of the first and second sets of switches introduces a synthetic Doppler shift into the first and second phase-shifted versions of the LO signal. In some exemplary embodiments, the synthetic Doppler shift is used to detect errors in the radar system. In some exemplary embodiments, the errors include leakage between transmit and receive circuits of the radar system. In some exemplary embodiments, the detected errors are used to calibrate the radar system.

According to another aspect, a signal processing method in a radar system is provided. The method includes: receiving a radio frequency (RF) signal at an RF input; receiving a local oscillator (LO) signal and a LO input; applying a selectable phase shift to the LO signal to produce a first phase-shifted version of the LO signal and a second phase-shifted version of the LO signal, the first and second phase-shifted versions of the LO signal being in quadrature; controlling a first set of switches to selectively apply the selectable phase shift to the LO signal; receiving the RF signal at a first input of a first mixer unit; receiving the RF signal at a first input of a second mixer unit; controlling a second set of switches to apply one of the first and second phase-shifted versions of the LO signal to one of a second input of the first mixer unit and a second input of the second mixer unit and to apply the other of the first and second phase-shifted versions of the LO signal to the other of the second input of the first mixer unit and the second input of the second mixer unit; and generating a count, the count sequencing through states of the first and second set of switches.

In some exemplary embodiments, the plurality of phase shifters comprise two fixed phase shifters, one of which provides 0 degrees of phase shift and one of which provides 180 degrees of phase shift.

In some exemplary embodiments, the first set of switches is controllable to selectively apply phase shift of one of the two fixed phase shifters to the LO signal.

In some exemplary embodiments, the plurality of phase shifters comprise an I/Q phase shifter which provides 45 degrees of lead phase shift and 45 degrees of lag phase shift to generate the first and second phase-shifted versions of the LO signal in quadrature.

In some exemplary embodiments, the counter is a two-bit binary up/down counter.

In some exemplary embodiments, the radar system is a homodyne system.

In some exemplary embodiments, the first mixer unit generates a first inphase output signal $I_{OUT}$ by mixing the RF signal and the one of the first and second phase shifted versions of the LO signal received at the second input of the first mixer unit; and the second mixer unit generates a first quadrature output signal $Q_{OUT}$ by mixing the RF signal and the other of the first and second phase shifted versions of the LO signal received at the second input of the second mixer unit.

In some exemplary embodiments, the method further comprises using $I_{OUT}$ and $Q_{OUT}$ to correct for errors and leakage measurements to calibrate the radar system.

In some exemplary embodiments, sequencing through the states of the first and second sets of switches introduces a synthetic Doppler shift into the first and second phase-shifted versions of the LO signal. In some exemplary embodiments, the synthetic Doppler shift is used to detect errors in the radar system. In some exemplary embodiments, the errors include leakage between transmit and receive circuits of the radar system. In some exemplary embodiments, the detected errors are used to calibrate the radar system.

BRIEF DESCRIPTION OF THE DRAWINGS

The foregoing and other features and advantages will be apparent from the more particular description of preferred embodiments, as illustrated in the accompanying drawings, in which like reference characters refer to the same parts throughout the different views. The drawings are not necessarily to scale, emphasis instead being placed upon illustrating the principles of the inventive concept.

DETAILED DESCRIPTION

Figure 1:
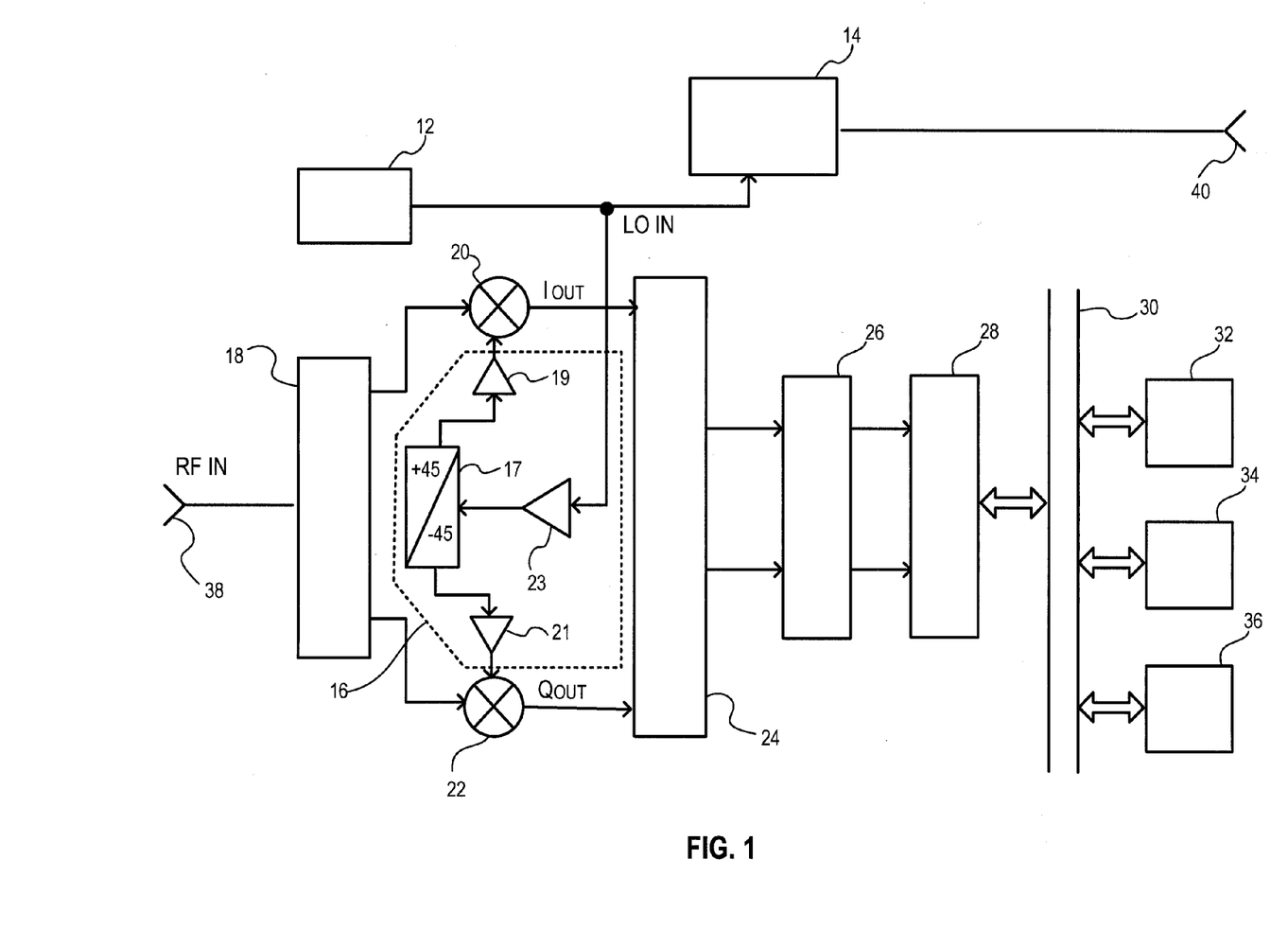
FIG. 1 includes a schematic block diagram of a radar system for processing automobile radar signals, in accordance with some exemplary embodiments.

FIG. 1 includes a schematic block diagram of a radar system 10 for processing automobile radar signals, in accordance with some exemplary embodiments. Referring to FIG. 1, radar system 10 processes radar transmit and receive signals to implement the radar operation and functionality in the host automobile for providing one or more safety and/or assist features, such as forward collision warning, blind spot detection, parking assist, and/or other features.

Radar system 10 generates and transmits radar signals into the region adjacent to the host automobile that is being monitored by radar system 10. Generation and transmission of signals is accomplished by RF signal generator 12, radar transmit circuitry 14 and transmit antenna 40. Radar transmit circuitry 14 generally includes any circuitry required to generate the signals transmitted via transmit antenna 40, such as pulse shaping circuitry, transmit trigger circuitry, RF switch circuitry, or any other appropriate transmit circuitry used by radar system 10.

Radar system 10 also receives returning radar signals at radar receive circuitry 18 via receive antenna 38. Radar receive circuitry 18 generally includes any circuitry required to process the signals received via receive antenna 38, such as low noise amplification, receive trigger circuitry, RF switch circuitry, RF signal splitter circuitry, or any other appropriate receive circuitry used by radar system 10. RF signal splitter circuitry within radar receive circuitry 18 splits the incoming RF signal into two RF signals and routes each of the two split RF signals to a first input of a respective one of RF mixers, mixer units or mixing units 20 and 22.

As described above, RF signal generator 12 generates the RF radar signal transmitted via radar transmit circuitry 14 and transmit antenna 40. In some exemplary embodiments, RF signal generator 12 also generates an LO signal, and applies the LO signal to phase shifting and signal splitting circuitry 16, which splits the LO signal into two LO signal paths and applies a phase shift to one or both of the split LO signals such that the two LO signals are in quadrature, i.e., have a phase difference of 90 degrees. Each of the split and phase-shifted LO signals is applied to a second input of a respective one of RF mixers, mixer units or mixing units 20 and 22.

Phase shifting and signal splitting circuitry 16 can receive the LO signal from RF signal generator 12 at an optional amplifier 23, which can amplify the LO signal as required for subsequent processing. The amplified LO signal is applied to a phase shifter and signal splitter 17, which splits the amplified LO signal into two LO signals, and applies a desired phase shift to each of the split LO signals to cause the two split and phase-shifted LO signals to be in quadrature. One side of phase shifter and signal splitter 17 advances the phase of its received split LO signal by +45 degrees, and the other side of phase shifter and signal splitter 17 retards the phase of its received split LO signal by −45 degrees, such that the desired 90-degree phase difference between the split and phase-shifter LO signals is obtained. The one of the split and phase-shifted LO signals with the advanced phase is applied to mixer 20, optionally through another optional amplifier 19. The one of the split and phase-shifted LO signals with the retarded phase is applied to mixer 22, optionally through another optional amplifier 21.

Each RF mixer 20 and 22 mixes a respective split RF signal from radar receive circuitry 18 with a respective split and phase-shifted LO signal from phase shifting and RF signal splitting circuitry 16. In some exemplary embodiments, radar system 10 is a homodyne system. Therefore, the split RF signals and split and phase-shifted LO signals are at essentially the same frequency, such that the two difference signals generated by mixers 20 and 22 are baseband signals. These two signals, referred to as the baseband I (inphase) and Q (quadrature) signals, $I_{OUT}$ and $Q_{OUT}$, respectively, can be applied to optional filtering and amplification circuitry 24 for any additional required filtering and/or amplification. The resulting baseband I and Q signals are then digitized by analog-to-digital converter circuitry (ADC) 26. The digitized baseband I and Q signals are then forwarded to a processor 28 for radar signal processing.

Processor 28 can be one of various types of processors capable of carrying out the processing on the digitized baseband I and Q signals to provide the radar operation and functionality of radar system 10. As such, processor 28 can be a digital signal processor (DSP), microprocessor, microcontroller, or other such device. In order to carry out its radar signal processing function, processor 28 interfaces via a system bus 30 with one or more other required circuits, such as one or more memory devices 32 of one or more types of memory, generally identified by reference numeral 32; any required peripheral circuitry, generally identified by reference numeral 34; and any required input/output circuitry, generally identified by reference numeral 36.

Figure 2:
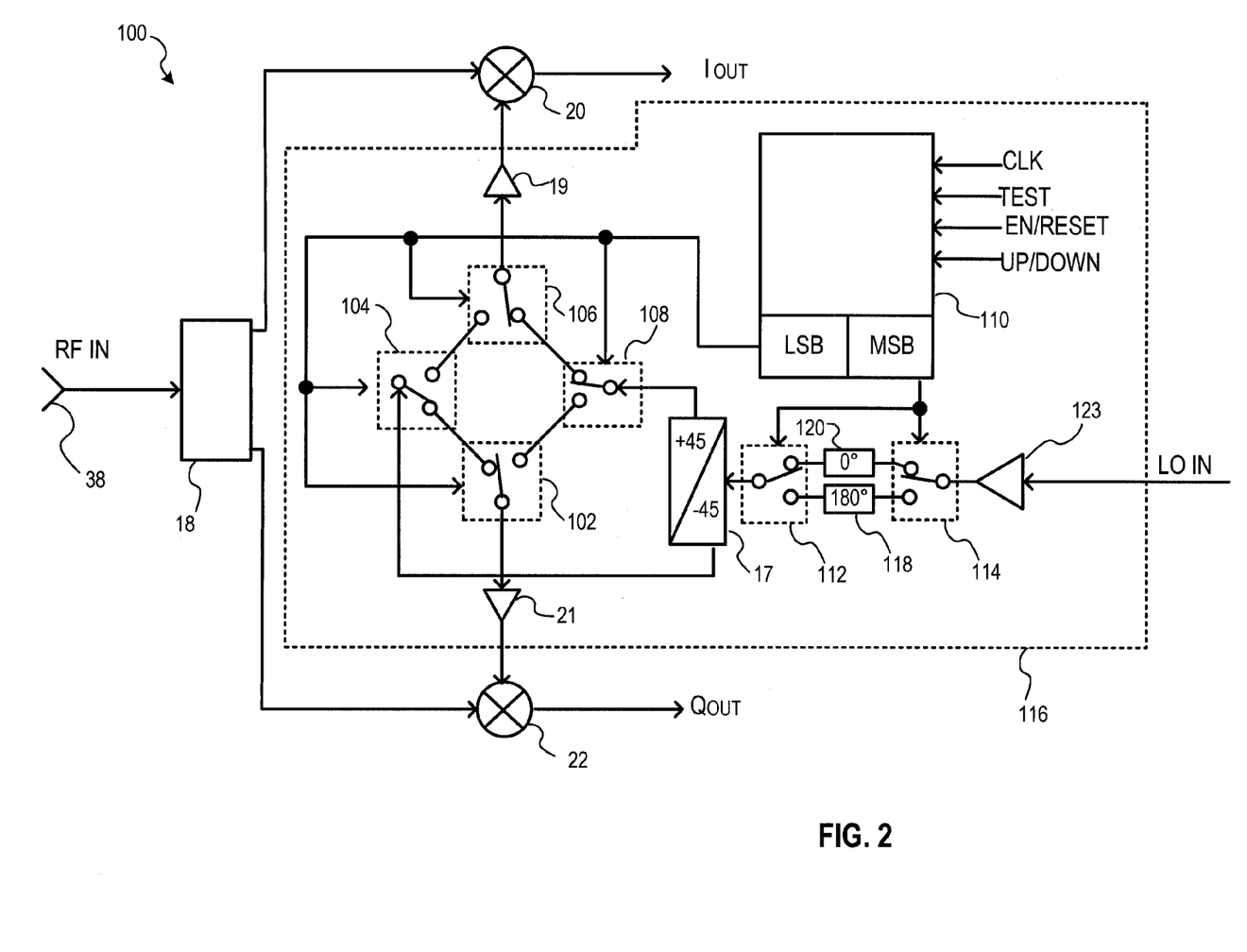
FIG. 2 includes a schematic detailed block diagram of a portion of a radar system, illustrating details of phase shifting and signal splitting circuitry illustrated in FIG. 1, according to exemplary embodiments.

FIG. 2 includes a schematic detailed block diagram of a portion of a radar system 100, illustrating details of phase shifting and signal splitting circuitry illustrated in FIG. 1, according to exemplary embodiments. Referring to FIG. 2, elements of radar system 100 that were described above in detail in connection with radar system 10 of FIG. 1 are not illustrated in FIG. 2. Detailed description of those like elements will not be repeated.

Referring to FIG. 2, input RF signal RF IN is received by receive antenna 38 and forwarded to radar receive circuitry 18. RF signal splitter circuitry within radar receive circuitry 18 splits the incoming RF signal into two RF signals and routes each of the two split RF signals to a first input of a respective one of RF mixers, mixer units or mixing units 20 and 22.

Phase shifting and RF signal splitting circuitry 116 receives the LO signal LO IN from RF signal generator 12 (FIG. 1). Circuitry 116 splits the LO signal into two signals, introduces a predetermined phase shift to the two split LO signals and forwards the two phase-shifted split LO signals to the two mixer units 20 and 22, optionally via optional amplifiers 19 and 21, respectively.

Phase shifting and RF signal splitting circuitry 116 optionally includes an optional amplifier 123, which provides any required amplification to the received LO signal. According to some embodiments, either 0 degrees or 180 degrees of phase shift is introduced to the received LO signal by fixed phase shifter 120 or 118, respectively, depending on the states of RF switches 112 and 114. According to some exemplary embodiments, RF switches 112 and 114 can be configured to one of two possible states. In the configuration illustrated in FIG. 2, both switches 112 and 114 are in a first state, such that the received LO signal is routed through phase shifter 120, which introduces 0 degrees of phase shift, i.e., no phase shift, into the LO signal. Switches 112 and 114 can also be configured to a second state, in which the LO signal is routed through phase shifter 118, which introduces 180 degrees of phase shift into the LO signal.

The LO signal is routed from switch 112 to phase shifter and signal splitter 17, which splits the LO signal into two split LO signals, and applies a desired phase shift to each of the split LO signals to generate the two split and phase-shifted LO signals in quadrature. One side of phase shifter and signal splitter 17 advances the phase of its received split LO signal by +45 degrees, and the other side of phase shifter and signal splitter 17 retards the phase of its received split LO signal by −45 degrees, such that the desired 90-degree phase difference between the split and phase-shifter LO signals is obtained. The one of the split and phase-shifted LO signals with the advanced phase is applied to the input of switch 108, and the one of the split and phase-shifted LO signals with the retarded phase is applied to the input of switch 104.

According to some exemplary embodiments, switches 102, 104, 106 and 108 are configured to one of two possible states to route the split and phase-shifted LO signals to the appropriate mixer unit 20 or 22. In a first state of switches 102, 104, 106 and 108, as illustrated in FIG. 2, the one of the split and phase-shifted LO signals with the +45-degree advanced phase is routed through switches 108 and 106 to mixer 20, optionally through optional amplifier 19; and the one of the split and phase-shifted LO signals with the −45-degree retarded phase is routed through switches 104 and 102 to mixer 22, optionally through optional amplifier 21. In the second state of switches 102, 104, 106 and 108, i.e., the state opposite to that illustrated in FIG. 2, the one of the split and phase-shifted LO signals with the +45-degree advanced phase is routed through switches 108 and 102 to mixer 22, optionally through optional amplifier 21; and the one of the split and phase-shifted LO signals with the −45-degree retarded phase is routed through switches 104 and 106 to mixer 20, optionally through optional amplifier 21.

Hence, the states of switches 102, 104, 106, 108, 112 and 114 determine the relative phase of the $I_{OUT}$ and $Q_{OUT}$ signals output by mixer units 20 and 22, respectively. Each of switches 102, 104, 106, 108, 112 and 114 can assume one of two possible states. The pair of switches 112 and 114 switches together under the control of a single control signal which is applied to both switches substantially simultaneously, such that both switches can be configured in either the state illustrated in FIG. 2 or in the other of the two possible states of the switches. The four switches 102, 104, 106 and 108 switch together under the control of another single control signal which is applied to all four switches substantially simultaneously, such that all four switches can be configured in either the state illustrated in FIG. 2 or in the other of the two possible states of all four switches.

As described above, switches 112 and 114 toggle between two possible states under control of a single control signal. Similarly, switches 102, 104, 106 and 108 toggle between two possible states under control of another single control signal. In some exemplary embodiments, the control signals are generated by a two-bit binary up/down counter 110, which is reset and enabled by EN/RESET input signal, and which counts under the control of an input clock signal CLK. In some exemplary embodiments, counter 110 sequentially counts up or down, depending on the state of the UP/DOWN input signal applied to counter 110. In up counting, the output value of counter 110 follows the normal binary sequence 00, 01, 10, 11, 00, etc. In down counting, the output value of counter 110 follows the normal binary sequence 11, 10, 01, 00, 11, etc.

In both up counting and down counting, the least significant bit (LSB) of the count in counter 110 toggles between the 0 and 1 states at the frequency of the input clock signal CLK, while the most significant bit (MSB) toggles between the 0 and 1 states at half the frequency of the input clock signal CLK. As illustrated in FIG. 2, in some exemplary embodiments, the control signal used to control the states of switches 102, 104, 106 and 108 is the LSB of the count in counter 110. Hence, when counter 110 is counting, the one of the mixer units 20, 22 to which each of the split and phase-shifted LO signals is applied alternates at the frequency of the input clock signal CLK. As illustrated in FIG. 2, in some exemplary embodiments, the control signal used to control the states of switches 112 and 114 is the MSB of the count in counter 110. Hence, when counter 110 is counting, the amount of phase shift introduced into the LO IN signal by fixed phase shifters 118 and 120 alternates between 0 degrees and 180 degrees, at one-half the frequency of the input clock signal CLK. For each mixer the phase progresses sequentially, in 90 degree increments or decrements, through 360 degrees. The relative phase of the split signals is always in quadrature.

This sequential phase shift applied to the LO signals results in a synthetic Doppler shift being introduced into the LO signals. This Doppler shift may be made either positive or negative, depending on whether counter 110 is made to count up or down. The Doppler shift moves the frequency of the LO signals away from the frequency of the input RF signal. This is especially useful in a homodyne system in which the RF input and the LO signals are at essentially the same frequency. In such systems, errors due to such factors as leakage between transmit and receive circuits are at DC and, as such, because they cannot be distinguished from mixer DC offsets, are difficult to detect and correct. According to the exemplary embodiments, with the Doppler shift introduced into the LO signals, errors due to leakage are shifted away from DC where they can more readily be detected, measured and compensated for, i.e., corrected. Hence, this approach of the present inventive concept of introducing a synthetic Doppler shift into the LO signals by creating a rotating phase shift vector applied to the LO signals provides an approach to determining the level of transmit/receive leakage, and also a means for built-in self-test (BIST) and system calibration.

Figure 3:
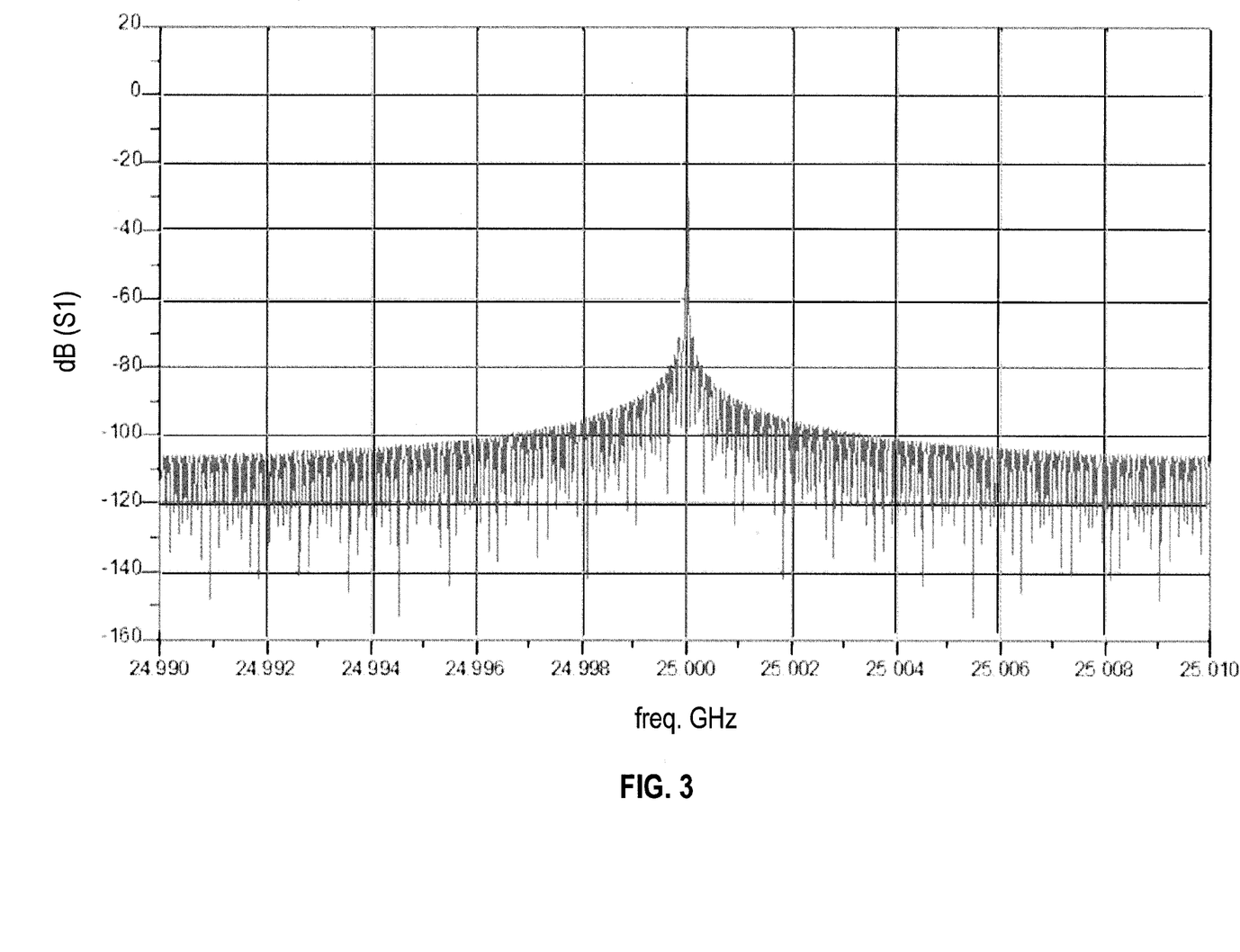
FIG. 3 includes a plot of a frequency spectrum for an exemplary LO signal without the synthetic Doppler shift of the exemplary embodiments.

FIG. 3 includes a plot of a frequency spectrum for an exemplary LO signal without the synthetic Doppler shift of the exemplary embodiments applied to the LO signal having the spectrum of FIG. 3. Referring to FIG. 3, the nominal frequency and peak of the spectrum for the exemplary LO signal is shown at 25.000 GHz.

Figure 4:
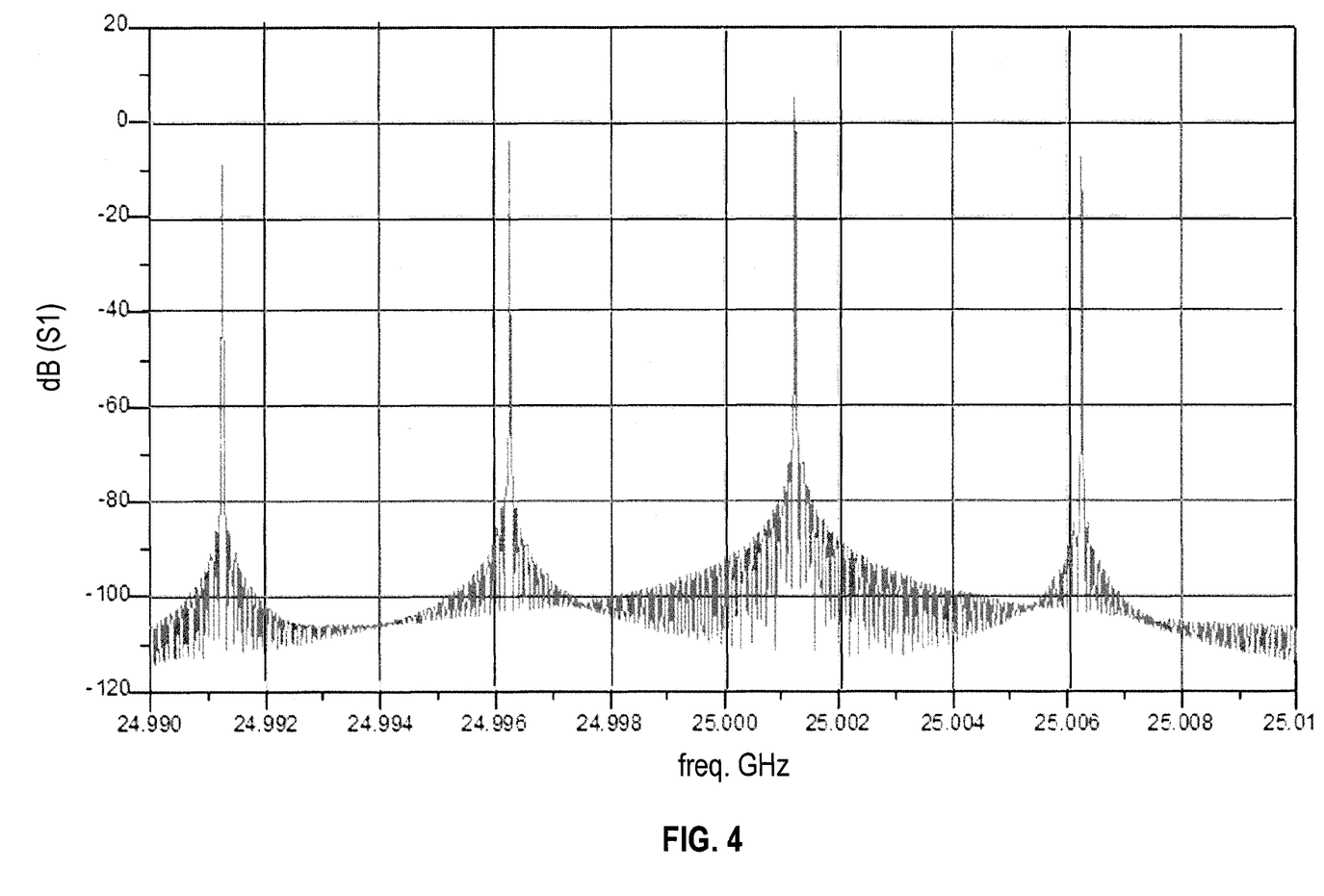
FIG. 4 includes a plot of a frequency spectrum for an exemplary LO signal with the synthetic Doppler shift of the exemplary embodiments.

FIG. 4 includes a plot of a frequency spectrum for an exemplary LO signal with the synthetic Doppler shift of the exemplary embodiments. Referring to FIG. 4, the amount of frequency shift is determined by the frequency of the input clock signal CLK to counter 110 (FIG. 2) and the resulting frequency of an entire cycle through the binary sequence, i.e., 00, 01, 10, 11. In this particular exemplary illustration, the frequency of the clock signal CLK is 5.0 MHz, and, therefore, the frequency of a complete cycle through the binary count sequence is 1.25 MHz. It can be seen in FIG. 4 that, due to the synthetic Doppler of the exemplary embodiments, the nominal peak frequency of the spectrum has been shifted up by 1.25 MHz to 25.00125 GHz. It should be noted that this plot is ideal under conditions of perfect amplitude and phase matching.

Figure 5:
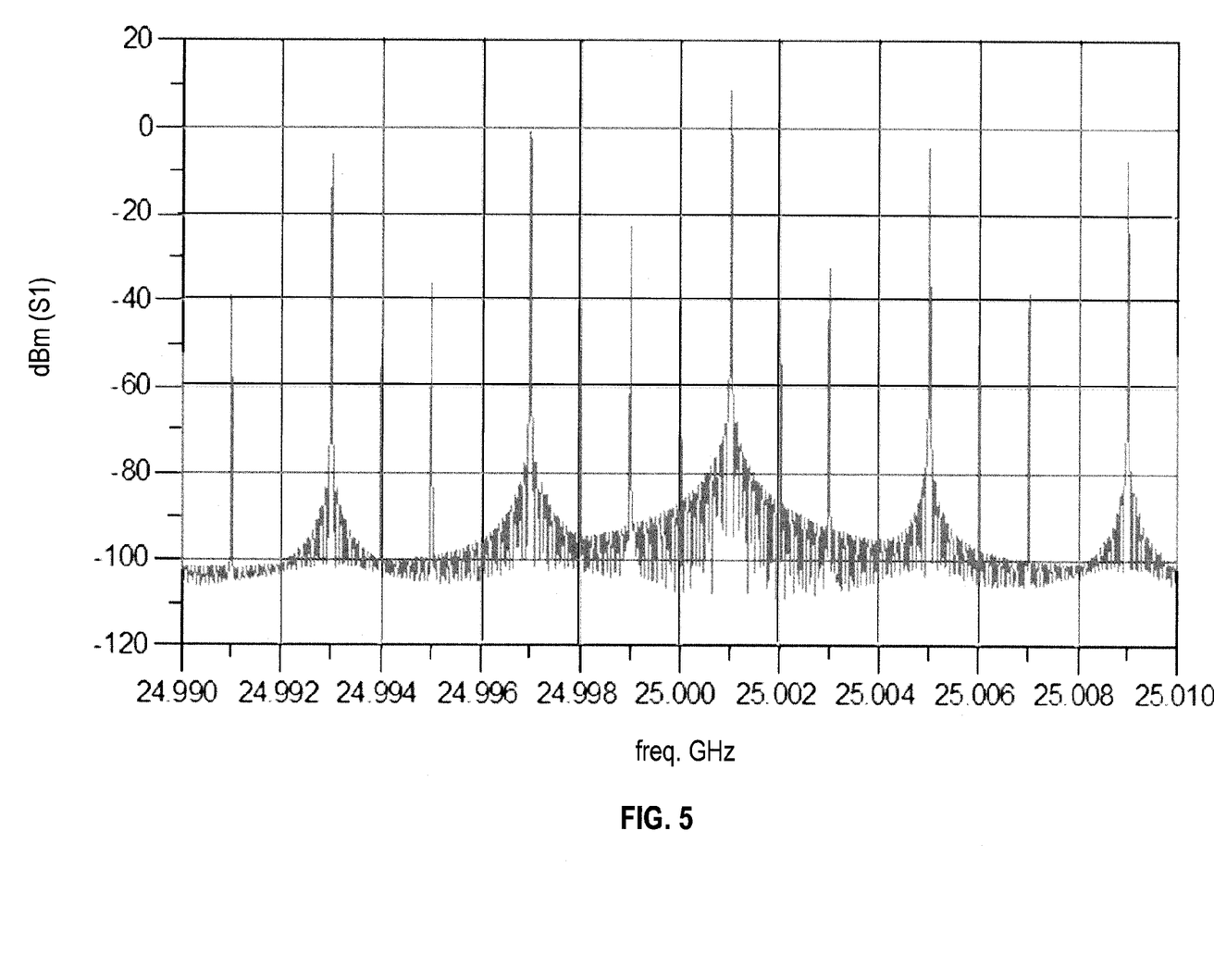
FIG. 5 includes a plot of another frequency spectrum for an exemplary LO signal with the synthetic Doppler shift of the exemplary embodiments and includes the effects of imperfect amplitude and phase balance found in I and Q type mixers.
Figure 6:
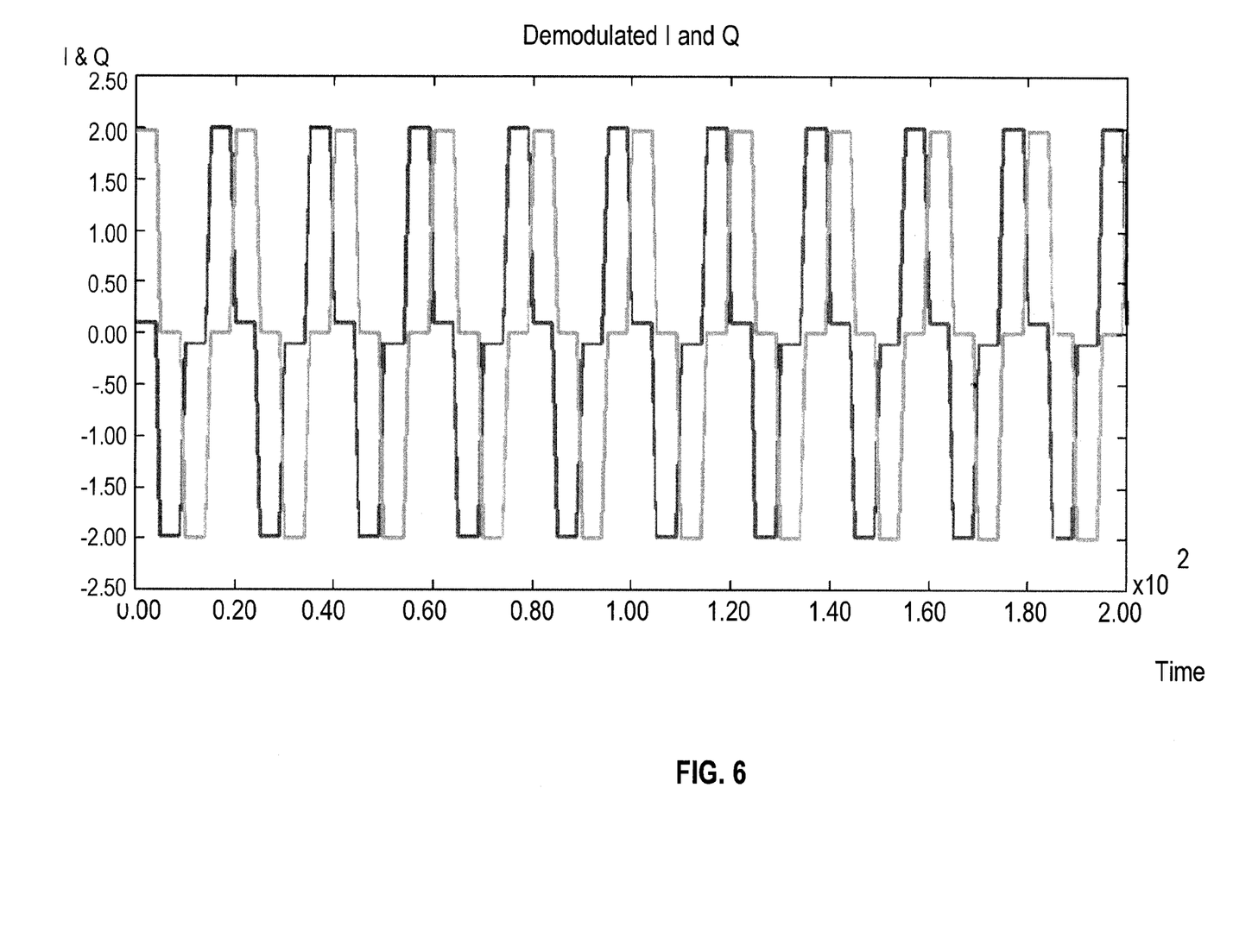
FIG. 6 includes a plot of the $I_{OUT}$ and $Q_{OUT}$ signals based on the LO of the spectrum illustrated in FIG. 5.

FIG. 5 includes a plot of another frequency spectrum for an exemplary LO signal with the synthetic Doppler shift of the exemplary embodiments. Referring to FIG. 5, the plot shows the shifted LO with typical amplitude and phase errors. Analysis of the baseband $I_{OUT}$ and $Q_{OUT}$ signals based on the LO of this spectrum by processor 28 (FIG. 1) allows for calibration for and removal of the errors. Removal of the errors according to the inventive concept eliminates the possibility that the errors could appear as false targets to radar system 100. FIG. 6 includes a plot of the $I_{OUT}$ and $Q_{OUT}$ signals based on the LO of the spectrum illustrated in FIG. 5.

While the present inventive concept has been particularly shown and described with reference to exemplary embodiments thereof, it will be understood by those of ordinary skill in the art that various changes in form and details may be made therein without departing from the spirit and scope of the present inventive concept as defined by the following claims.

I claim:

1. An inphase/quadrature (I/Q) mixer for a radar system, comprising:
   a radio frequency (RF) input for receiving an RF signal;
   a local oscillator (LO) input for receiving a LO signal;
   a first stage of phase shitting circuitry for receiving the LO signal and applying a selectable phase shift to the LO signal to produce a first phase-shifted version of the LO signal;
   a first set of switches being controllable to route the LO signal through the first stage of phase shifting circuitry to selectively apply the selectable phase shift to the LO signal according to states of the first set of switches, to produce the first phase-shifted version of the LO signal;
   a first mixer unit receiving the RF signal at a first input of the first mixer unit;
   a second mixer unit receiving the RF signal at a first input of the second mixer unit;
   a second stage of phase shifting circuitry for receiving the first phase-shifted version of the LO signal, spitting the first phase-shifted version of the LO signal into a pair of split signals, and applying second and third phase shifts to the pair of split signals, respectively, to produce a pair of second phase-shifted versions of the LO signal, such that the pair of second phase-shifted versions of the LO signal are in quadrature;
   a second set of switches being controllable to apply one of the pair of second phase-shifted versions of the LO signal to one of a second input of the first mixer unit and a second input of the second mixer unit and to apply the other of the pair of second phase-shifted versions of the LO signal to the other of the second input of the first mixer unit and the second input of the second mixer unit according to states of the second set of switches; and
   a two-bit binary counter for generating a two-bit binary count in sequence, a most-significant bit (MSB) of the two-bit binary count being applied to the first set of switches to control the states of the first set of switches and a least-significant bit (LSB) of the two-bit binary count being applied to the second set of switches to control the states of the second set of switches, the two-bit binary count sequencing through the states of the first and second sets of switches as the two-bit binary count is generated in sequence.

2. The I/Q mixer of claim 1, wherein the I/Q mixer is part of a homodyne radar system.

3. The I/Q mixer of claim 1, wherein the first stage of phase shifting circuitry comprises two fixed phase shifters, one of which provides 0 degrees of phase shift and another of which provides 180 degrees of phase shift.

4. The I/Q mixer of claim 3, wherein the first set of switches is controllable by the MSB to selectively apply phase shift of one of the two fixed phase shifters to the LO signal.

5. The I/Q mixer of claim 1, wherein the second stage of phase shifting circuitry comprises an I/Q phase shifter which selectively provides 45 degrees of lead phase shift and 45 degrees of lag phase shift to generate the pair of second phase-shifted versions of the LO signal in quadrature.

6. The I/Q mixer of claim 5, wherein the second set of switches is controllable by the LSB to selectively apply the lead or lag phase shift.

7. The I/Q mixer of claim 1, wherein the I/Q mixer is a built-in self-test (BIST) element of the radar system.

8. The I/Q mixer of claim 1, wherein sequencing through the states of the first and second sets of switches introduces a synthetic Doppler shift into the pair of second phase-shifted versions of the LO signal.

9. The I/Q mixer of claim 8, wherein the synthetic Doppler shift is used to detect errors in the radar system.

10. The I/Q mixer of claim 9, wherein the errors include leakage between transmit and receive circuits of the radar system.

11. The I/Q mixer of claim 9, wherein the detected errors are used to calibrate the radar system.

12. A signal processing method in a radar system, the method comprising:
   receiving a radio frequency (RF) signal at an RF input;
   receiving a local oscillator (LO) signal and a LO input;
   applying the LO signal to a first stage of phase shifting circuitry to apply a selectable phase shift to the LO signal to produce a first phase-shifted version of the LO signal;
   controlling a first set of switches to selectively apply the selectable phase shift to the LO signal according to states of the first set of switches, to produce the first phase-shifted version of the LO signal;
   receiving the RF signal at a first input of a first mixer unit;
   receiving the RF signal at a first input of a second mixer unit;
   applying the first phase-shifted version of the LO signal to a second stage of phase shifting circuitry to lit the first phase-shifted version of the LO signal into a pr of split signals and to apply second and third phase shifts to the pair of split signals, respectively, to produce a pair of second phase-shifted versions of the LO signal, such that the pair of second phase-shifted versions of the LO signal are in quadrature;

controlling a second set of switches to apply one of the pair of second phase-shifted versions of the LO signal to one of a second input of the first mixer unit and a second input of the second mixer unit and to apply the other of the pair of second phase-shifted versions of the LO signal to the other of the second input of the first mixer unit and the second input of the second mixer unit according to states of the second set of switches; and generating a two-bit binary count in sequence, a most-significant bit (MSB) of the two-bit binary count being applied to the first set of switches to control the states of the first set of switches and a least-significant bit (LSB) of the two-bit binary count being applied to the second set of switches to control the states of the second set of switches, the two-bit binary count sequencing through the states of the first and second sets of switches as the two-bit binary count is generated in sequence.

13. The method of claim 12, wherein the first stage of phase shifting circuitry comprises two fixed phase shifters, one of which provides 0 degrees of phase shift and one of which provides 180 degrees of phase shift.

14. The method of claim 13, wherein the first set of switches is controllable by the MSB to selectively apply phase shift of one of the two fixed phase shifters to the LO signal.

15. The method of claim 12, wherein the second stage of phase shifting circuitry comprises an I/Q phase shifter which selectively provides 45 degrees of lead phase shift and 45 degrees of lag phase shift to generate the pair of second phase-shifted versions of the LO signal in quadrature.

16. The method of claim 15, wherein the second set of switches is controllable by the LSB to selectively apply the lead or lag phase shift.

17. The method of claim 12, wherein the radar system is a homodyne system.

18. The method of claim 12, wherein:

the first mixer unit generates a first inphase output signal $I_{OUT}$ by mixing the RF signal and the one of the pair of second phase shifted versions of the LO signal received at the second input of the first mixer unit; and the second mixer unit generates a first quadrature output signal $Q_{OUT}$ by mixing the RF signal and the other of the pair of second phase shifted versions of the LO signal received at the second input of the second mixer unit.

19. The method of claim 18, further comprising using $I_{OUT}$ and $Q_{OUT}$ to correct for errors and leakage measurements to calibrate the radar system.

20. The method of claim 12, wherein sequencing through the states of the first and second sets of switches introduces a synthetic Doppler shift into the pair of second phase-shifted versions of the LO signal.

21. The method of claim 20, wherein the synthetic Doppler shift is used to detect errors in the radar system.

22. The method of claim 21, wherein the errors include leakage between transmit and receive circuits of the radar system.

23. The method of claim 21, wherein the detected errors are used to calibrate the radar system.

\* \* \* \* \*